United States Patent Office 2,861,104
Patented Nov. 18, 1958

2,861,104

METHOD OF PREPARING 2-HYDROXY-4-ALKOXYBENZOPHENONES

William H. von Glahn, Loudonville, and Lester N. Stanley, Delmar, N. Y., assignors to General Aniline & Film Corporation, New York, N. Y., a corporation of Delaware No Drawing. Application June 22, 1956
Serial No. 593,023

6 Claims. (Cl. 260—591)

This invention relates to 2-hydroxy-4-alkoxybenzophenones, and particularly to an improved process of preparing the same.

It is known that 2-hydroxy-4-alkoxybenzophenones are utilized as absorbents for ultraviolet light in various transparent sheet materials and for the stabilization of transparent plastics. When such compounds are utilized as ultraviolet absorbers in materials, such as plastics, resins, film-forming materials, including colored textiles, and the like, it is extremely important that the compounds be of the highest degree of purity and stability upon storage.

The 2-hydroxy-4-alkoxybenzophenones can be prepared by several methods which are described in the literature. For example, B. König et al., Berichte 39, 4028 (1906), describes the preparation by alkylation of the corresponding 2,4-dihydroxybenzophenone and Kauffmann et al., Berichte 43, 1208 (1910), describes the preparation by de-alkylation of the corresponding 2,4-dimethoxybenzophenone.

A further method which has been employed is the condensation of an approximately molecular equivalent of benzoyl chloride with resorcinol dialkyl ether employing aluminum chloride as condensing and de-alkylating agent.

The principal shortcoming of the foregoing procedure is that the aluminum chloride alone is too reactive as a dealkylating agent. The desired 2-hydroxy-4-alkoxybenzophenone is always contaminated with 2,4-dihydroxybenzophenone and other decomposition products. Inasmuch as it is essential for cerain uses, such as ultraviolet absorption for colorless organic film-forming plastics, resins, gums, waxes, etc., to utilize substantially pure 2-hydroxy-4-alkoxybenzophenones, the presently available process is incapable of yielding the said benzophenones in a high degree of purity.

We have discovered that the foregoing procedure can be improved decidedly to yield 2-hydroxy-4-alkoxybenzophenones of a high degree of purity and free from contaminants of the aforementioned type by replacing the aluminum chloride with a mixture of aluminum chloride and zinc chloride as the condensing and de-alkylating reagent.

By employing such a mixture, the activity of the aluminum chloride is so regulated that the benzoylation occurs in an easy manner, and when the condensation product is warmed in order to de-alkylate one of the alkoxy groups, the control of the reaction is facilitated, and as a result 2-hydroxy-4-alkoxybenzophenones are produced in a high degree of purity in a good yield and virtually free from contaminants.

Accordingly, it is an object of the present invention to provide an improved process of preparing 2-hydroxy-4-alkoxybenzophenones.

Other objects and advantages will become manifest from the following description:

The process involved in obtaining the foregoing compounds is carried out by first preparing the condensing and de-alkylating reagent which consists of the following:

Aluminum chloride—70–90% by weight. Zinc chloride—10–30% by weight.

The mixture may be used as such by merely mixing it in a suitable solvent-diluent or in lieu thereof, the mixture may be first mixed and heated with stirring to sufficiently high temperature to produce a melt. Usually a temperature of about 150° C. is sufficient. The resulting melt, after cooling, is readily soluble or dispersible in the inert solvent-diluent. Other variations of employing the mixtures will become evident from the working examples.

In employing the mixture as a condensing and de-alkylating reagent the amount to be utilized ranges from 95 to 125 parts by weight per 100–180 parts by weight of a 1,3-dialkoxybenzene.

With the catalyst prepared, the second step in the process consists in dissolving 100–180 parts by weight of a 1,3-dialkoxybenzene such as 1,3-dimethoxybenzene, 1,3-diethoxybenzene, 1,3-diisopropoxybenzene, 1,3-di-n-butoxybenzene, and 1,3-diisoamyloxybenzene, and the like, in an inert solvent-diluent such as for example, nitrobenzene, carbon disulfide, ethylene dichloride, 1,1,1-trichloroethane, 1,1,2-trichloroethane, 1,3-dichloropropane, etc. The solution is cooled to at least 0° C. and not higher than 10° C. and from 95–125 parts by weight reagent are added with stirring, and the temperature maintained at 0°–10° C. 104 grams of benzoyl chloride is run into this mixture in a suitable time, i. e. about ½ hour's time, while making certain that the temperature is below 10° C. This temperature is held for about one hour, and then the reaction mixture heated gently and held at between about 45° to 75° C., and preferably at about 65°–70° C. for sufficient time for de-alkylation to take place, i. e. about 4–20 hours. The resulting reaction mixture is cooled to below 10° C., and decomposed with acidified ice water. At this point an additional quantity of an inert solvent-diluent is added to dissolve the product. If desired, it may be heated, up to about 70° C., to enhance solution. The lower oil layer is separated, extracted with aqueous sodium hydroxide or any other suitable caustic alkali. The basic solution, after the removal of the residual solvent-diluent and acidification while maintaining a low temperature, i. e. below about 10° C., yields an almost colorless solid which is filtered, sucked dry, washed with cold water until salt free and dried. One crystallization from a low boiling alcohol is sufficient to yield a product of high purity and free from contaminants.

The following examples will illustrate the improved process. All the parts given are by weight unless otherwise noted.

Example I

A mixture of the condensing and de-alkylating reagent was prepared by mixing together 11 grams of zinc chloride and 99 grams of aluminum chloride to yield a mixture weighing 110 grams. The mixture was heated to about 140°–150° C., under constant agitation. The melt was cooled to 80° C. and 480 cc. of ethylene dichloride added. A substantial portion of the melt went into solution and the mixture was cooled to 0° C. 100 grams of 1,3-dimethoxybenzene were added while maintaining the solution at 0°–5° C. At this point 104 grams of benzoyl chloride was run into the reaction mixture in about ½ hour's time while maintaining the temperature below 10° C. The temperature was held at below 10° C. for one hour then heated for six hours up to a temperature of 65° C. At this point the heating was continued at 65° C. for eight hours. The reaction mixture was cooled to 0° C. and run into a mixture of ice water and hydrochloric acid. Approximately 500 cc. ethylene dichloride was added and the reaction mixture then warmed up to about 50-60° C. with agitation to take up the product into the solvent, ethylene dichloride, layer. Agitation was discontinued and the layers allowed to separate. The aqueous de-alkylated layer was separated off and the heavy oil layer washed several times with water and separated. The solvent, ethylene dichloride, and unchanged 1,3-dimethoxybenzene were removed by steam distillation. The resulting product, after recrystallization from isopropanol gave an almost colorless crystalline product, melting point 63°-64° C., and a yield of approximately 117 grams (71% of theory).

*Example II*

To 480 cc. of ethylene dichloride, 11 grams of zinc chloride were added. At room temperature 99 grams of aluminum chloride were then added and the charge stirred for one hour after which 100 grams of 1,3-dimethoxybenzene were added at 0°-5° C. While maintaining the charge at this temperature, 104 grams of benzoyl chloride was run into the reaction mixture in about one-half hour's time. The temperature was slowly raised to 65° C. during a period of about 4 hours and held there for 8 hours. After recrystallization from isopropanol, practically colorless crystals of 2-hydroxy-4-methoxybenzophenone were obtained having a melting point of 63° to 64° C. in a yield of approximately 100 grams.

The proportions of the salts in the condensing de-alkylating mixture were the same as in Example I.

*Example III*

To 400 cc. of ethylene dichloride at room temperature were added 27.5 grams of zinc chloride and 82.5 grams of aluminum chloride. The charge was stirred for thirty minutes, then cooled to 0° C. 100 grams of 1,3-dimethoxybenzene were added at 0° C. and stirred well. At 0° C. 104 grams of benzoyl chloride were run into the reaction mixture in about one-half hour's time. The charge was gradually raised and maintained at 60°-65° C. for a period of 16 hours and the charge then finished as in Example I.

The buff colored product was recrystallized once from ethanol, and after drying had a melting point of 63°-64° C. The yield was approximately 59% of theory.

The proportions of the salts used in the condensing and de-alkylating mixture are as follows:
Aluminum chloride—75%. Zinc chloride—25%.

*Example IV*

To 480 grams of ethylene chloride were added 30 grams of zinc chloride. After cooling to 5° C., 70 grams of aluminum chloride were added. The charge was heated to reflux for a few minutes in order to obtain a solution, and then cooled to 0° C. 100 grams of 1,3-dimethoxybenzene were added and 104 grams of benzoyl chloride run into the reaction mixture in about one-half hour's time while maintaining the temperature at 0°-5° C. The charge was slowly raised to and maintained at 65° C. for about 16 hours, and then finished as in Example I.

After a single recrystallization from methanol, followed by drying, the final cream colored powder had a melting point of 63° to 64° C. The yield was about 59% of theory.

The proportions of the salts in the two-component mixture are as follows:
Aluminum chloride—70%. Zinc chloride—30%.

*Example V*

Example I was repeated with the exception that 100 grams of 1,3-dimethoxybenzene were replaced by 120 grams of 1,3-diethoxybenzene. After recrystallization from isopropanol, a cream colored powder was obtained having ultraviolet absorption properties.

*Example VI*

Example I was repeated with the exception that 100 grams of 1,3-dimethoxybenzene were replaced by 140 grams of 1,3-diisopropoxybenzene to give a buff colored product having ultraviolet absorption properties.

*Example VII*

Example I was repeated with the exception that 100 grams of 1,3-dimethoxybenzene were replaced by 160 grams of 1,3-di-n-butoxybenzene to give a buff colored product having ultraviolet absorption properties.

*Example VIII*

Example I was repeated with the exception that 100 grams of 1,3-dimethoxybenzene were replaced by 179 grams of 1,3-diisoamyloxybenzene to give a buff colored product having ultraviolet absorption properties.

*Example IX*

Example I was again repeated with the exception that the zinc chloride-aluminum chloride mixture was replaced by 109 parts of zinc chloride. The resulting product was primarily an oil insoluble in the caustic solution used in the extraction and was shown to be unreacted 1,3-dimethoxybenzene.

From the foregoing example it becomes clearly manifest that the use of zinc chloride alone is ineffective.

The ratio of 10-30% by weight of zinc chloride and 70-90% by weight of aluminum chloride is very critical and any combination outside of these proportions will yield a catalyst or condensing and de-alkylating mixture which gives very poor yields of products which are dark in color with very low melting points, and in some instances, products of an ester-like odor.

Reference is made to the copending application of Lester N. Stanley and Stiles M. Roberts, Serial No. 593,024, filed of even date herewith, which application discloses and claims a similar process in which a mixture of alkali metal halide and aluminum is used as a catalyst.

We claim:

1. The process of preparing 2-hydroxy-4-alkoxybenzophenones which comprises first condensing 100–180 parts by weight of a 1,3-dialkoxybenzene with benzoyl chloride at a temperature ranging between 0° and 10° C. in the presence of an inert solvent-diluent and in the presence of a reagent mixture consisting of 10–30% by weight of zinc chloride and 70–90% by weight of aluminum chloride, said reagent mixture being employed in the range of 95–125 parts by weight per 100–180 parts by weight of said 1,3-dialkoxybenzene, then raising and holding the temperature between 45°–75° C. to de-alkylate the condensation product and isolating a 2-hydroxy-4-alkoxybenzophenone.

2. The process according to claim 1 wherein the 1,3-dialkoxybenzene is 1,3-dimethoxybenzene.

3. The process according to claim 1 wherein the 1,3-dialkoxybenzene is 1,3-diethoxybenzene.

4. The process according to claim 1 wherein the 1,3-dialkoxybenzene is 1,3-diisopropoxybenzene.

5. The process according to claim 1 wherein the 1,3-dialkoxybenzene is 1,3-di-n-butoxybenzene.

6. The process according to claim 1 wherein the 1,3-dialkoxybenzene is 1,3-diisoamyloxybenzene.

References Cited in the file of this patent

Thomas: Anhyd. Aluminum Chloride in Org. Chem., pp. 315, 316, 868, 869, 874–876 (1941).